United States Patent
Lee

(10) Patent No.: US 9,794,763 B1
(45) Date of Patent: Oct. 17, 2017

(54) METHOD AND SYSTEM FOR SHARING DOCUMENTS ON MOBILE MESSENGER

(71) Applicant: Kukudocs Inc., Seongnam-si, Gyeonggi-do (KR)

(72) Inventor: Yu Ho Lee, Seoul (KR)

(73) Assignee: Kukudocs Inc., Seongnam-si (KR)

( * ) Notice: Subject to any disclaimer, the term of this patent is extended or adjusted under 35 U.S.C. 154(b) by 0 days.

(21) Appl. No.: 15/382,747

(22) Filed: Dec. 19, 2016

(30) Foreign Application Priority Data

May 17, 2016 (KR) .................. 10-2016-0060281

(51) Int. Cl.
| | |
|---|---|
| *G06F 15/16* | (2006.01) |
| *H04W 4/18* | (2009.01) |
| *H04W 4/12* | (2009.01) |
| *H04L 12/58* | (2006.01) |
| *H04L 29/08* | (2006.01) |

(52) U.S. Cl.
CPC ............ *H04W 4/185* (2013.01); *H04L 51/08* (2013.01); *H04L 51/14* (2013.01); *H04L 67/02* (2013.01); *H04L 67/06* (2013.01); *H04L 67/1097* (2013.01); *H04W 4/12* (2013.01)

(58) Field of Classification Search
CPC .......... H04W 4/185; H04W 4/12; H04L 51/08
USPC ....................................................... 709/203
See application file for complete search history.

(56) References Cited

U.S. PATENT DOCUMENTS

| | | | |
|---|---|---|---|
| 8,195,746 B2* | 6/2012 | Heidloff ............... | H04L 51/08 709/205 |
| 2011/0264745 A1* | 10/2011 | Ferlitsch ............ | H04L 12/1827 709/205 |

FOREIGN PATENT DOCUMENTS

| | | |
|---|---|---|
| JP | 2007-272777 A | 10/2007 |
| JP | 2012-243286 A | 12/2012 |
| KR | 10-2010-0079370 A | 7/2010 |
| KR | 10-2011-0017694 A | 2/2011 |
| KR | 10-2012-0090897 A | 8/2012 |
| KR | 10-2015-0119668 A | 10/2015 |

OTHER PUBLICATIONS

Sabel. StructuringWiki Revision History. ACM. 2007.*
Cadiz et al. Using Web Annotations for Asynchronous Collaboration Around Documents. ACM. 2000.*
Korean Office Action dated Jul. 14, 2016 corresponding to counterpart Korean Application No. 10-2016-0060281.

* cited by examiner

*Primary Examiner* — Bryan Lee
(74) *Attorney, Agent, or Firm* — Hauptman Ham, LLP

(57) ABSTRACT

According to an embodiment of the present invention, a method of sharing a document on a mobile messenger includes uploading a document from a document sender's mobile device to a first server, transmitting the uploaded document from the first server to a second server, and converting the transmitted document to hypertext markup language (HTML) format and forwarding a first web address of the converted document to a mobile messenger running on the document sender's mobile device and one or more document receivers' mobile devices.

10 Claims, 2 Drawing Sheets

METHOD AND SYSTEM FOR SHARING DOCUMENTS ON MOBILE MESSENGER

CROSS-REFERENCE TO RELATED APPLICATION

This application claims priority to and the benefit of Korean Patent Application No. 10-2016-0060281, filed on May 17, 2016, the disclosure of which is incorporated herein by reference in its entirety.

BACKGROUND

1. Field of the Invention

The present invention relates to a method and system for sharing documents on a mobile messenger that enable users to share documents on a mobile messenger and, accordingly, to immediately modify the documents and share the modified documents on the mobile messenger.

2. Discussion of Related Art

When a person uploads a document file to a messenger to share the document file and communicate on a messenger system, another person who wants to modify the document file has to download the corresponding document file, modify the document file, and then re-upload the modified document file to the messenger. Also, the person who initially uploaded the document file to the messenger has to download the modified document file, save the modified document file, and then access the modified document file.

In this case, because documents are repeatedly uploaded and downloaded, the number of saved document files increases and there are problems in that confusion occurs and it is difficult to manage the document files. A security problem also exists because document files cannot be prevented from being downloaded by another person during a process of sharing the document files.

Currently, an office application capable of editing a document on a mobile environment exists. However, the existing application occupies a large amount of resources and memory, and, even though a simple means of editing is required, the application occupying a large amount of resources and memory has to be downloaded and run to perform editing.

RELATED ART DOCUMENT

Patent Document (Patent document 1) KR 10-2011-0017694

SUMMARY OF THE INVENTION

The present invention is directed to a method and system for sharing documents on a mobile messenger that enable users to share documents on a mobile messenger and, accordingly, to immediately modify the documents and share the modified documents on the mobile messenger.

According to an embodiment of the present invention, a method of sharing a document on a mobile messenger includes uploading a document from a document sender's mobile device to a first server, transmitting the uploaded document from the first server to a second server, and converting the transmitted document to hypertext markup language (HTML) format and forwarding a first web address of the converted document to a mobile messenger running on the document sender's mobile device and one or more document receivers' mobile devices.

The uploading of a document to the first server may include, when the document is uploaded to a mobile messenger of the document sender's mobile device, uploading the document to the first server.

Meanwhile, the method of sharing a document on a mobile messenger according to the present invention may further include, when the document is uploaded to the first server, generating, by the first server, a second web address corresponding to the uploaded document.

A document linked to the first web address may include a history file added by the second server.

The history file may include editing information that shows edits made to the converted document.

The editing information may include a list arranged by editing time or editing subject.

Meanwhile, the method of sharing a document on a mobile messenger according to the present invention may further include, when there is a request to access the forwarded first web address from one or more of the sender's device and the receiver's device, transmitting the document linked to the first web address from the second server.

The forwarding may include adding a history file to the converted document, saving the converted document to the second server, and forwarding the first web address corresponding to the saved document.

The transmitting of the document linked to the first web address may include transmitting a combined document that is a result of combining document information corresponding to a list that is selected among a plurality of lists forming the history file by one or more of the sender's device and receiver's device with a most recently saved document.

According to an embodiment of the present invention, a system for sharing a document on a mobile messenger includes a first server configured to save a document uploaded from a document sender's mobile device and a second server configured to receive the saved document from the first server, wherein the second server converts the document transmitted from the first server to HTML format and forwards a first web address of the converted document to a mobile messenger running on the document sender's mobile device and one or more receivers' mobile devices.

The first server may generate a second web address corresponding to the uploaded document.

A document linked to the first web address may include a history file added by the second server.

The history file may include editing information on the converted document.

The editing information may include one or more of an editing subject, an editing time, and an editing location.

When there is a request to access the first web address, the second server may transmit the document linked to the first web address to a subject of the access request.

The second server may save the converted document and a history file together and forward the first web address corresponding to a document file in which the converted document and the history file are saved together.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
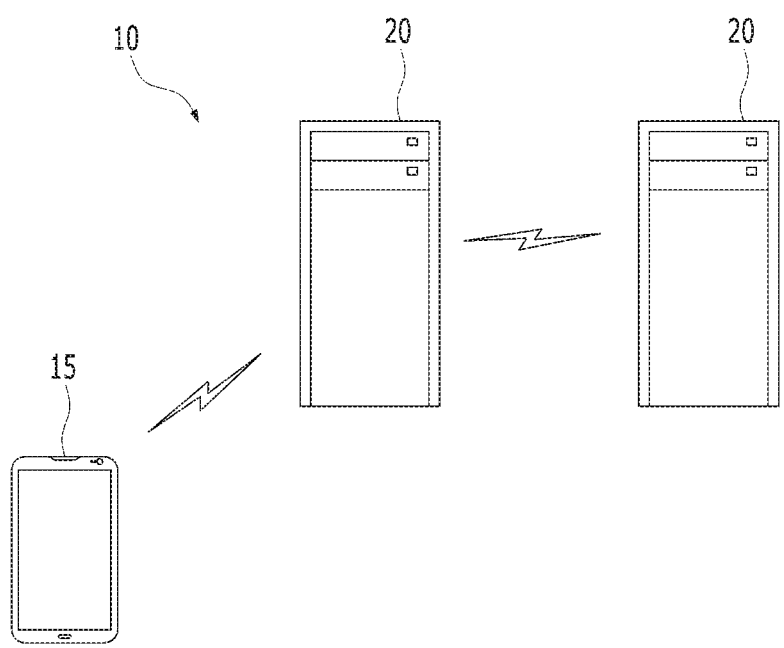
FIG. 1 is a view illustrating a system for sharing a document on a mobile messenger according to an embodiment of the present invention.

Specific structural or functional descriptions of embodiments of the present invention disclosed in the present specification or application are merely given as examples for describing embodiments of the present invention. Embodiments of the present invention may be practiced in various forms and are not to be construed as being limited to the embodiments described in the present specification or application.

Since various modifications may be made to the present invention and the present invention may have various embodiments, particular embodiments will be illustrated in the drawings and described in detail in the present specification or application. However, the detailed descriptions below are not intended to limit embodiments according to a concept of the present invention to particular embodiments, and all modifications, equivalents, and substitutes included in the spirit and technical scope of the present invention should be construed as belonging to the present invention.

Terms including ordinals such as first and second may be used to describe various elements, but the elements are not limited by the terms. The terms are only used for the purpose of distinguishing one element from another element. For example, a second element may be referred to as a first element while not departing from the scope according to the concept of the present invention, and likewise, a first element may be referred to as a second element.

When a certain element is described as being "connected" or "linked" to another element, although the certain element may be directly connected or linked to the other element, it should be understood that another element may exist therebetween. On the other hand, when a certain element is described as being "directly connected" or "directly linked" to another element, it should be understood that other elements do not exist therebetween. Other expressions for describing a relation between elements, i.e., "between —," "right between —," "adjacent to —," "abutting —", and the like, should also be construed in the same manner. Terms used in the present specification are merely used to describe particular embodiments and are not intended to limit the present invention. A singular expression includes a plural expression unless clearly indicated otherwise by context. In the present specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the present invention pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, the present invention will be described in detail by describing exemplary embodiments of the present invention with reference to the accompanying drawings. Like reference numerals throughout the drawings represent the same element.

FIG. 1 is a view illustrating a mobile messenger document sharing system 10 according to the present invention. Referring to FIG. 1, the mobile messenger document sharing system 10 includes a first server 20 configured to save a document uploaded from a document sender's mobile device 15 and a second server 30 configured to receive the saved document from the first server 20, convert the document transmitted from the first server 20 to hypertext markup language (HTML) format, and forward a first web address of the converted document to the document sender's mobile device 15 and a receiver's mobile device (not illustrated).

Here, the mobile device 15 may be any one of various types of wearable devices such as a smartphone and a tablet personal computer (PC) that enable a document sender to access or edit a document and send the document to a server.

When the document sender uploads a document, the first server 20 generates a second web address corresponding to the uploaded document. Here, the document uploaded to the first server 20 may be a compressed document file such as a Microsoft Word document, a PowerPoint document, and an Excel document. The first server 20 transmits the uploaded document to the second server 30. The second web address may be generated in a uniform resource locator (URL) format.

The second server 30 receives a document from the first server 20, decompresses the document, and converts the document to HTML5 format. When the conversion of the document is finished, the second server 30 forwards the first web address assigned to the converted document to a mobile messenger running on the document sender's mobile device 15 and one or more receivers' mobile devices.

Here, the second server 30 may save the converted document and a history file together. The history file may include editing information on the document. The editing information is information regarding edits made to the document and may include one or more of an editing subject, an editing time, and an editing location. Also, the editing information includes a list arranged by editing time or editing subject and document information corresponding to the list. Meanwhile, the first web address may be generated in the URL format.

When there is a request for accessing the first web address, the second server 30 transmits a document linked to the first web address to a subject of the access request, i.e. the document sender's mobile device 15 or the receiver's mobile device. Here, the document linked to the first web address includes a history file added by the second server 30.

Also, the second server 30 transmits a combined document that is a result of combining document information corresponding to a list that is selected among a plurality of editing information lists forming a history file by one of the sender's device 15 or a receiver's device and the most recently saved document to one of the sender's device 15 or the receiver's device. When the sender or the receiver wants to access edits that have been previously made by himself or herself or another person, the sender or the receiver selects a desired item among the lists included in the history file and makes a request to the second server 30, and the second server 30 combines a most recently saved document with editing information corresponding to the selected item and provides the combined document to either of the sender's device 15 or the receiver's device or both of the sender's device 15 and the receiver's device.

That is, when a request to access the second web address from the sender's or receiver's device is transmitted to the first server 20, the second server 30 may receive the request from the first server 20 and transmit a document including a list of pieces of editing information to the device requesting the access.

When any one item among a list of pieces of editing information on the document transmitted from the device requesting the access is called for, the second server 30 combines the most recently saved document and a document corresponding to the called for item, and transmits the combined document to the calling device.

Figure 2:
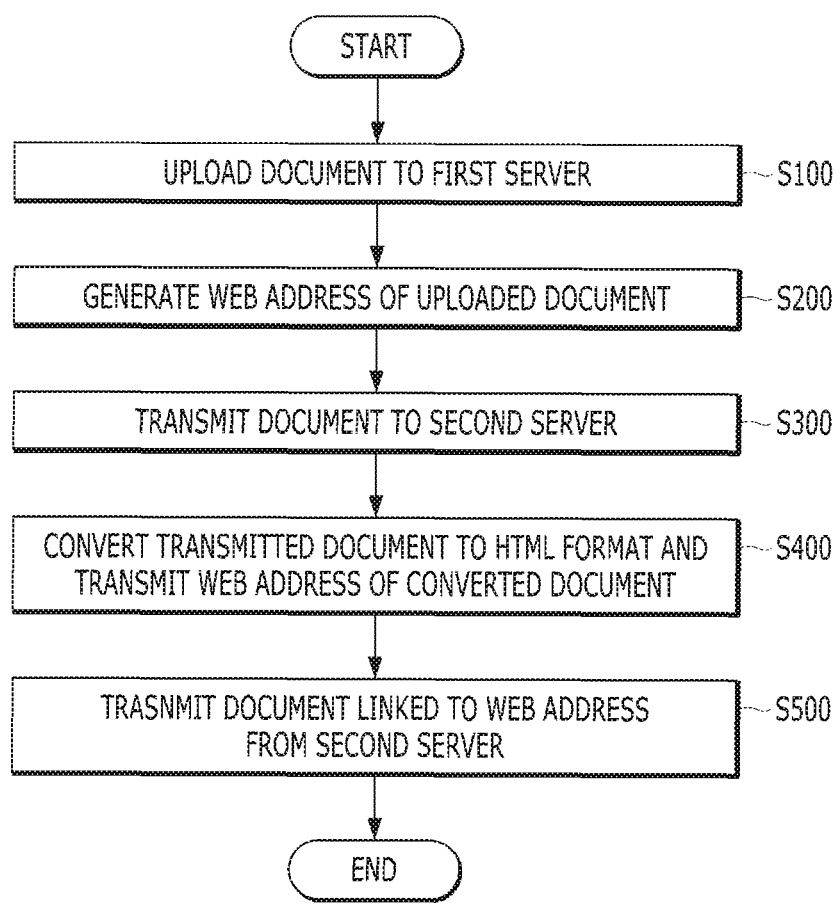
FIG. 2 is a flowchart of a method of sharing a document on a mobile messenger according to the present invention.

Meanwhile, FIG. 2 illustrates a flowchart of a method of sharing a document on a mobile messenger according to the present invention. Referring to FIG. 2, a method of sharing a document on a mobile messenger may include uploading a document from the document sender's mobile device 15 to the first server 20 (S100), when the document is uploaded to the first server 20, generating, by the first server, a second web address corresponding to the uploaded document (S200), transmitting the uploaded document from the first server 20 to the second server 30 (S300), converting, by the second server 30, the transmitted document to HTML format and forwarding a first web address linked to the converted document to a mobile messenger running on the document sender's mobile device 15 and one or more document receivers' mobile devices (S400), and transmitting the document linked to the first web address from the second server 30 when there is a request to access the first web address from one or more of the sender's device 15 and the receivers' devices (S500).

The uploading of the document to the first server 20 (S100) includes, when the document is uploaded to a mobile messenger of the document sender's mobile device 15, uploading the document to the first server 20. The document uploaded to the first server 20 may be a compressed Word file, a compressed PowerPoint file, a compressed Excel file, and the like.

When the document is uploaded, the first server 20 may first save the document, assign a second web address corresponding to the uploaded document, and transmit the second web address to one or more of the sender's device 15 and the receivers' devices. Alternatively, the first server 20 may not transmit the second web address to one or more of the sender's device 15 and the receivers' devices. This is so a first web address that will be generated later may be transmitted. Also, the first server 20 may transmit the document uploaded from the sender's device 15 and saved to the second server 30.

The second server 30 may decompress the document transmitted from the first server 20 then convert the document to HTML5 format, and add a history file including a list of pieces of editing information to the converted document when editing information on the document exists and save the document.

The second server 30 may forward the first web address assigned to the document saved to the second server 30 to the mobile messenger running on the document sender's mobile device 15 and one or more of the receivers' mobile devices.

The history file includes editing information on a document as described above. Specifically, the document converted to HTML5 format in the second server 30 consists of basic units of the document. Units of a document may be a paragraph in a case of a Word file and may be an object in a case of a PowerPoint file. Editing information may be information regarding an edit (a modification, a deletion, a save, and the like) made to a certain unit of a document among basic units of the document. Also, editing information may include information regarding an edit made to a certain file at a certain time by a certain subject.

The editing information may include a list arranged by editing time or editing subject and document information corresponding to the list.

When a sender or a receiver selects a first web address through his or her mobile device 15, the second server 30 may transmit a document linked to the first web address to one or more of the sender's and receiver's mobile devices 15. Here, the document is a document including a history file (i.e., a list of pieces of editing information). The second server 30 may transmit the document to the first server 20, and the first server 20 may transmit the document received from the second server 30 to one or more of the sender's and receiver's mobile devices 15.

Also, the transmitting of the document linked to the first web address (S500) may include transmitting a combined document that is a result of combining document information corresponding to a list that is selected among a plurality of lists forming the history file by one or more of the sender's device 15 and the receivers' devices with the most recently saved document.

For example, when the sender or the receiver wants to access edits that have been made by himself or herself a few days ago, one or more of the sender and the receiver may select or call for a corresponding list among the lists included in the history file through the sender's or receiver's mobile device 15. When there is a call for a corresponding list, the second server 30 combines the most recently saved document with editing information on the requested item and provides the combined document to the sender or the receiver.

That is, the sender and the receiver may share a document saved to the second server 30 with each other through a single first web address, may access a self-made edit or an edit made by another person at a certain time by selecting a list that consists of pieces of editing information without downloading the document to the sender's or receiver's device, and may re-edit the document on a mobile messenger.

Furthermore, a different list of pieces of editing information may be provided to each caller. That is, only a device designated by a caller may be included in a list of pieces of editing information. A history file may be separately saved for each editor of a document. The history file may be a JavaScript object notation (JSON) file.

The method and system 10 for sharing a document on a mobile messenger configured as described above may create a mobile environment in which users may share a document on a mobile messenger, edit the document on a messenger, share the edited document again, and have a discussion. Here, the mobile environment may share a modified and edited document without saving the document every time the document is modified and edited and includes history information so that a document that also contains previously-made edits may be shared.

According to an embodiment of the present invention, a messenger environment in which users can share a document on a mobile messenger, edit the document on a messenger, share the edited document again, and have a discussion can be provided.

The environment can share a modified and edited document without saving a document every time the document is modified and edited and includes history information so that a document that also contains previously-made edits may be shared.

In a reality in which a document capacity is increasing, modifications and the like on a document can be shared without saving the document so that consumption of memory and data is low, and the document can be prevented from being saved so that security of the document can be reinforced.

The description above is merely an illustrative description of the technical spirit of the present invention, and one of ordinary skill in the art to which the present invention pertains should be able to make various modifications and changes within a scope that does not depart from the fundamental features of the present invention. Consequently, the embodiments disclosed herein are for describing, rather than limiting, the technical spirit of the present invention, and the scope of the technical spirit of the present invention is not limited by the embodiments. The scope of the present invention should be construed by the claims below, and the entire technical spirit within the scope equivalent thereto should be construed as belonging to the scope of the present invention.

DESCRIPTION OF REFERENCE NUMERALS

10: Mobile messenger document sharing system
15: Sender's mobile device
20: First server
30: Second server

What is claimed is:

1. A method of sharing a document on a mobile messenger, the method comprising:
   uploading a document from a document sender's mobile device to a first server;
   transmitting the uploaded document from the first server to a second server; and
   converting the transmitted document to hypertext markup language (HTML) format and forwarding a first web address of the converted document to a mobile messenger running on the document sender's mobile device and one or more document receivers' mobile devices,
   wherein the document linked to the first web address includes a history file added by the second server,
   wherein the history file includes editing information that shows edits made to the converted document, and
   wherein the forwarding includes adding a history file to the converted document, saving the converted document to the second server, and forwarding the first web address corresponding to the saved document.

2. The method of claim 1, wherein the uploading of a document to the first server includes, when the document is uploaded to a mobile messenger of the document sender's mobile device, uploading the document to the first server.

3. The method of claim 1, further comprising, when the document is uploaded to the first server, generating, by the first server, a second web address corresponding to the uploaded document.

4. The method of claim 1, wherein the editing information includes a list arranged by editing time or editing subject.

5. The method of claim 1, further comprising, when there is a request to access the forwarded first web address from one or more of the sender's device and the receiver's device, transmitting the document linked to the first web address from the second server.

6. The method of claim 5, wherein the transmitting of the document linked to the first web address includes transmitting a combined document that is a result of combining document information corresponding to a list that is selected among a plurality of lists forming the history file by one or more of the sender's device and the receiver's device with a most recently saved document.

7. A system for sharing a document on a mobile messenger, the system comprising:
   a first server configured to save a document uploaded from a document sender's mobile device; and
   a second server configured to receive the saved document from the first server,
   wherein the second server converts the document transmitted from the first server to hypertext markup language (HTML) format and forwards a first web address of the converted document to a mobile messenger running on the document sender's mobile device and one or more receivers' mobile devices,
   wherein the document linked to the first web address includes a history file added by the second server,
   wherein the history file includes editing information on the converted document, and
   wherein the second server saves the converted document and a history file together and forwards the first web address corresponding to a document file in which the converted document and the history file are saved together.

8. The system of claim 7, wherein the first server generates a second web address corresponding to the uploaded document.

9. The system of claim 7, wherein the editing information includes one or more of an editing subject, an editing time, and an editing location.

10. The system of claim 7, wherein, when there is a request to access the first web address, the second server transmits the document linked to the first web address to a subject of the access request.

* * * * *